United States Patent [19]

Harmon et al.

[11] 4,062,525
[45] Dec. 13, 1977

[54] FOAM MIXING HEAD

[75] Inventors: Thomas Harmon, Hamilton, Ohio; Tracy Keeling, Houston, Tex.

[73] Assignee: Kornylak Corporation, Hamilton, Ohio

[21] Appl. No.: 570,455

[22] Filed: Apr. 22, 1975

[51] Int. Cl.² .............................................. B29B 1/06
[52] U.S. Cl. ................................... 366/138; 425/200; 425/225; 425/557; 425/562; 425/817 R; 366/172; 366/300
[58] Field of Search .................. 260/2.5 BC, 2.5 BD; 264/40, 54, 46.5; 259/6, 21, 23, 40, 95, 25, 103, 104; 425/4 R, 817 R, 130, 134, 225, 226, 227, 242 R, 200, 244, 209, 245 R; 239/112, 117, 414

[56] References Cited
U.S. PATENT DOCUMENTS

| | | | |
|---|---|---|---|
| 2,957,203 | 10/1960 | Marshall | 264/54 X |
| 3,090,078 | 5/1963 | Ackles | 264/54 X |
| 3,104,424 | 9/1963 | Immel | 425/200 X |
| 3,134,579 | 5/1964 | Booth, Sr. | 259/6 X |
| 3,141,865 | 7/1964 | McEvoy | 264/54 X |
| 3,154,618 | 10/1964 | Baer et al. | 425/200 X |
| 3,608,870 | 9/1971 | Aldridge | 259/23 |
| 3,642,392 | 2/1972 | Vanderhagen | 425/4 R |

*Primary Examiner*—Francis S. Husar
*Assistant Examiner*—Mark Rosenbaum
*Attorney, Agent, or Firm*—Beall & Jeffery

[57] ABSTRACT

Two foamable chemicals are diverted from a recirculation path by simultaneously operable pivoting ball valves to respective separate paths through respective one way valves, pressure responsive normally closed poppet valves, and a common conduit to a common mixing chamber wherein they are mixed by identical counter rotating shafts having roll pins extending through diametric bores, before the thus mixed chemicals are discharged into a suitable mold. Solvent and air are supplied under the control of selectively operable valves through pressure responsive poppet valves to the same common conduit as the chemicals for washing the chemicals from the conduit, from the outer face of the chemical poppet valves, and for further washing the mixing chamber. The controllable valves, the actuators for the controllable valves, and a drive motor for the counter rotating shafts are all contained on a main body that may be of a suitable size without restriction, and the check valves, pressure responsive valves, common conduit, counter rotating mixer shafts, and mixing chamber are all contained in a common flat head and generally symmetrically in a horizontal plane, so that the head is of minimum height for insertion into a mold. The chemical, solvent and air passage ways, and the mechanical drive between the mixer and drive motor all have separable couplings between the head and main body, so that an extension may be selectively inserted so that the automatic valve and mixing head may be inserted deeply into a mold cavity, for example to insert foam into a mold cavity approximately 1 inch high, of indefinite length, and of a width of 3 to 4 feet for making rigid foam panels with outer facing materials of metal or the like.

21 Claims, 8 Drawing Figures

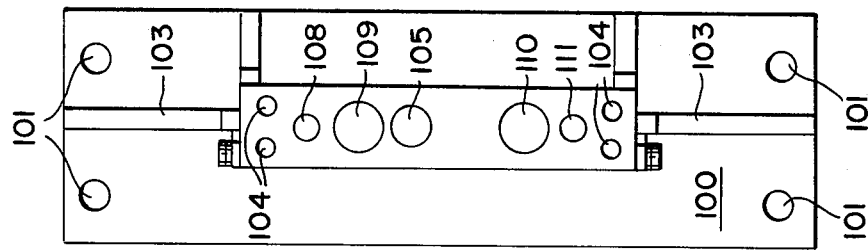
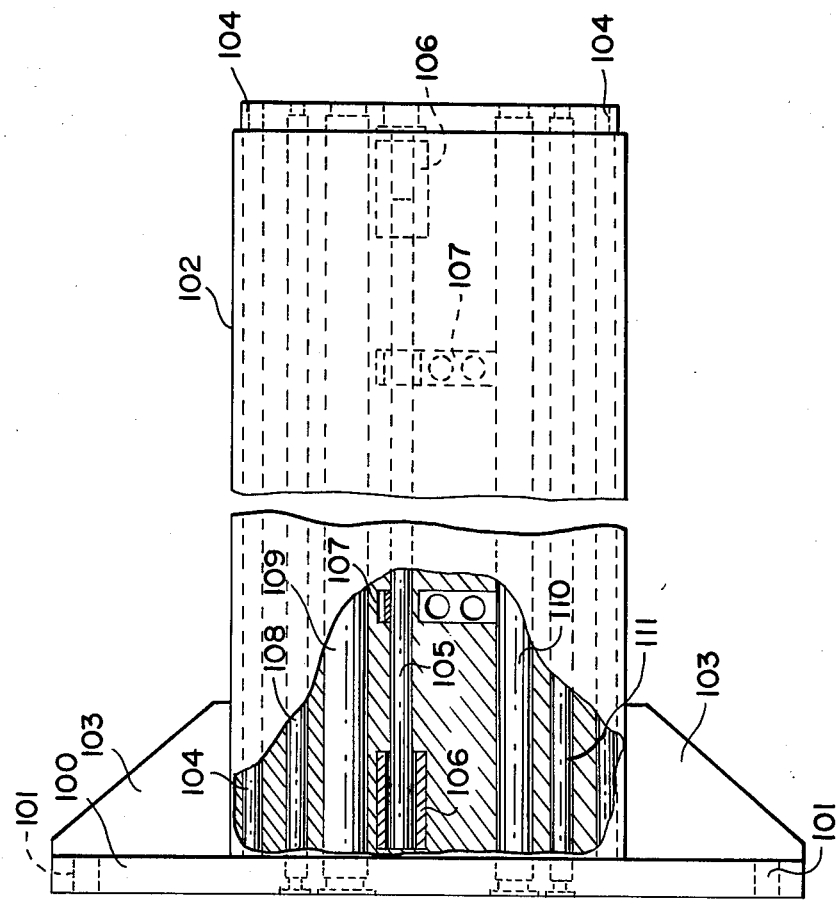

FOAM MIXING HEAD

BACKGROUND OF THE INVENTION

In recent years, rigid foam panelling has been used increasingly in the building trade, and various machines for forming the panelling and mixing the foaming chemicals are known. When depositing foam in an open top trough or mold, no particular difficulties arise with respect to the size of the mixing and depositing unit. However, when rigid outer skins are to be assembled with the foam as a core, there are considerable problems in the prior art.

When the rigid outer skins are assembled and substantially in their final position, that is parallel to each other and spaced a small distance apart before the foaming chemicals are deposited between them, long thin probes have been used to conduct the mixed chemicals into the space between the outer skins and deposit the chemicals. Such a probe is required to be as long as the panels are wide, which may be 3 to 6 feet, for example. It is desirable to have the chemicals foam as quickly as possible after the assembly moves into the curing and pressure tunnel of a conventional system, but quickly foaming chemicals present numerous problems in a long probe. Further, there is the difficulty of cleaning such a long probe.

It has been known to connect panels together at their edges opposite from the foam depositing means and pivot them apart a relatively great distance to insert the conventional bulky foam mixing units into the thus formed space, but this is very difficult with rigid outer skins, such as ribbed sheet steel, and in fact impossible when the sheet steel is provided in continuous strips, from for example a rolling mill, without having an excessive distance between the foam depositing station and the pressure tunnel to allow the sheet steel to be twisted to a parallel condition; such a long transition run would require that the foam chemicals have considerable delay in their foaming, which would in turn undesirably greatly lengthen the curing tunnel.

SUMMARY OF THE INVENTION

It is an object of the present invention to provide apparatus for mixing foamable chemicals and depositing them in a mold with a minimum travel of the mixed chemicals within the apparatus, and further to provide the mixing portion of the apparatus of sufficiently small dimensions in one direction that it may be inserted into a narrow mold gap.

A main body is provided to remain outside of the mold cavity and house the bulky item such as the mixer driving motor, controllable valves for the chemicals and an air-solvent mixture for cleaning, actuators for the controllable valves, interal piping and calibration mechanisms in combination with a minimum height head that may be inserted entirely into the narrow mold cavity, which head includes counter rotating mixer shafts, check valves for the foam chemicals, pressure operated poppet valves for the separately provided chemicals and solvent-air mixture, and a common conduit wherein the chemicals first contact each other and wherein the poppet valves open so that solvent-air mixture will flush across the faces of the chemical poppet valves in cleaning the conduit, counter rotating shafts and mixing chamber.

In the main body, solenoid valves are provided to control the supply of solvent, air, and catalyst or the like. The main foamable chemicals are preferably provided in a recirculation circuit to be selectively furnished to the pressure responsive poppet valves and check valves by the simultaneous shifting with a single actuator of two pivoted ball valves of unique construction.

The head and main body have complimentary couplings for the mixer driver shaft and conduits carrying the chemicals, solvent and air, so that they may be directly connected or connected by means of a selectively inserted extension having correspondingly identical couplings. An extension may be selected according to the width of the molding zone to be covered.

BRIEF DESCRIPTION OF THE DRAWING

Further objects, features and advantages of the present invention will become more clear from the following detailed description of the drawing, wherein:

FIG. 7 is a top plan view, with portions broken away, of an extension to be selectively inserted between the head and main body of FIG. 1; and FIG. 8 is an end view of the extension shown in FIG. 7.

DETAILED DESCRIPTION OF A PREFERRED EMBODIMENT

Figure 1:
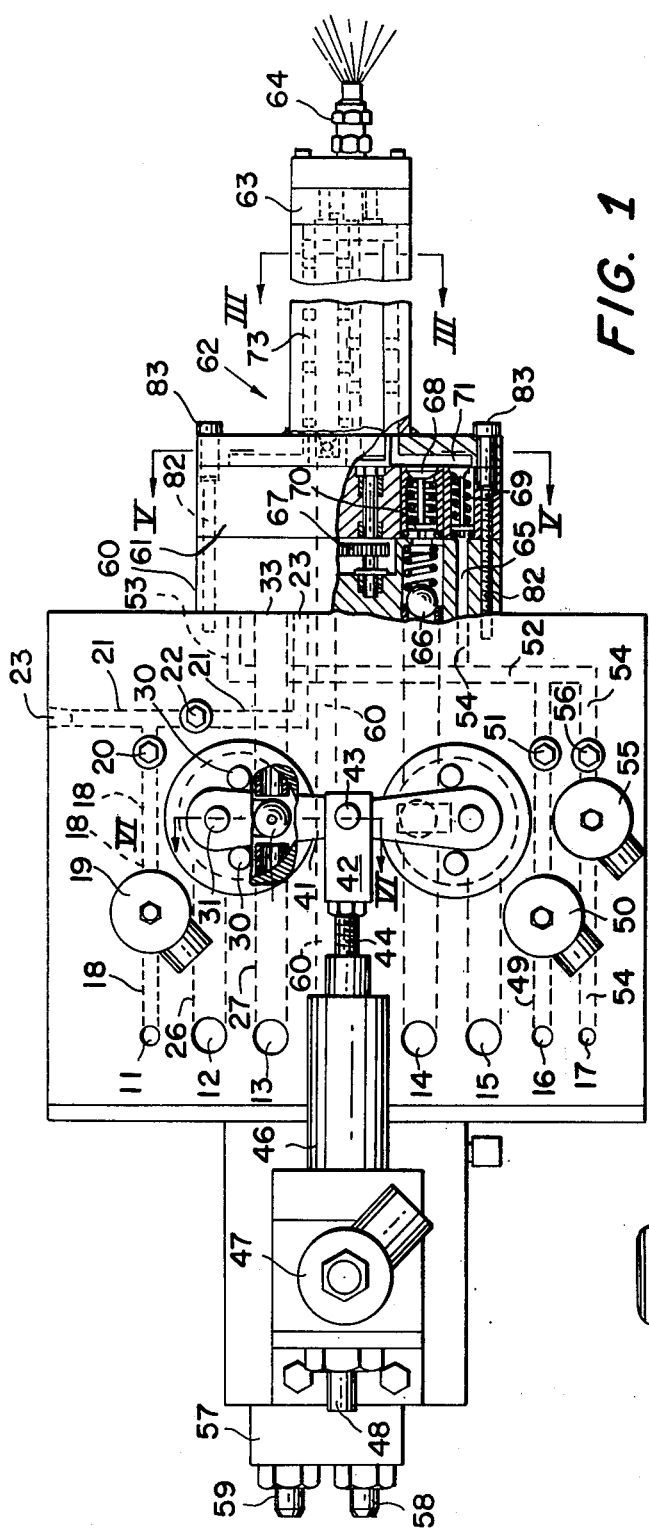
FIG. 1 is a top plan view of the apparatus for supplying, mixing and depositing foamable chemicals according to the present invention.
Figure 2:
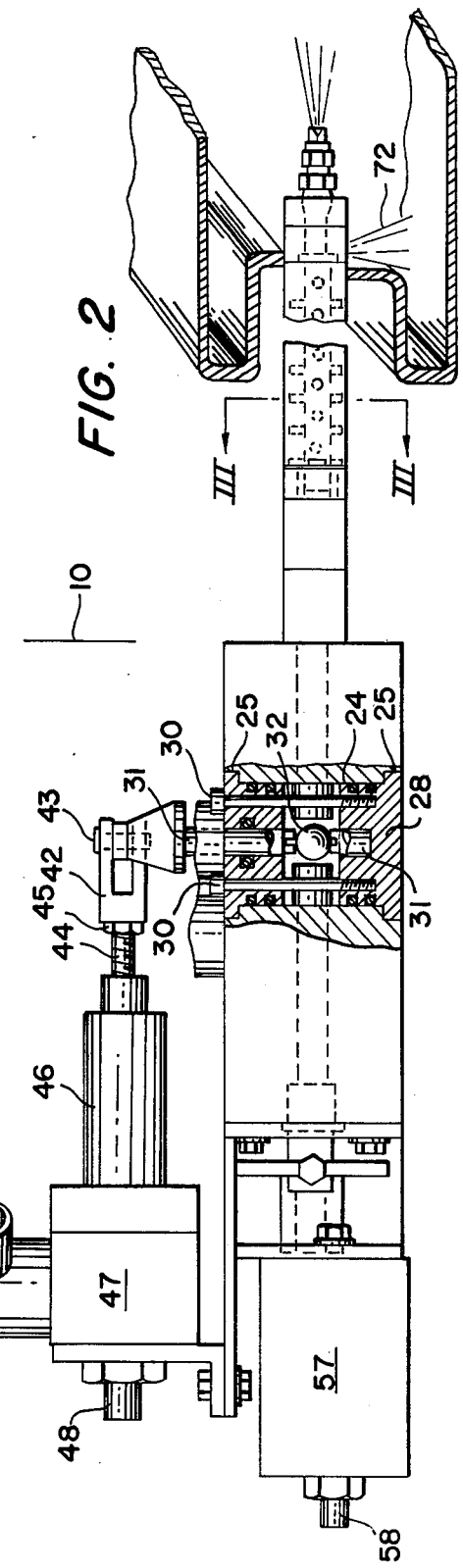
FIG. 2 is a side elevation view of the apparatus of FIG. 1.

As shown in FIGS. 1 and 2, the apparatus generally comprises a main body to the left of line 10, which includes couplings to supply for (not shown) compressed air, solvent, first and second foamable chemicals, and a third chemical to be added to the mixture, for example as a catalyst; controllable valves and their controls for selectively supplying the air, solvent, and chemicals to a plurality of respective couplings generally along line 10; a drive motor and drive shaft for a mechanical mixer, with the drive shaft terminating in a coupling generally at line 10. To the right of line 10, there is provided a live mixing head of minimum height that may be inserted into a mold cavity, and which contains check valves for the chemicals, pressure responsive poppet valves for the air, solvent and chemicals, a mixing chamber having counter rotating mechanical mixers, and a discharge port; the head further contains complimentary couplings along line 10 for the chemicals, air, solvent and drive shaft. The extension of FIGS. 7 and 8 may be inserted at line 10 between the head and main body.

The fluid contacting portions of the MAIN BODY are preferably formed by drilling passages in rigid blocks and rigidly connecting tubes and the like in such passages, so that the blocks may be rigidly assembled together by clamping or welding to form all internal passages for fluid materials being handled. The following pipe couplings are provided leading into the main body, which may be of any conventional construction, for example threaded apertures for receiving the threaded ends of flexible fluid pressure lines (not shown); coupling 11 receives a chemical such as a catalyst or additive; coupling 12 receives one of the foamable chemicals under pressure; coupling 13 returns the first foamable chemical to its source where it may be pressurized and recirculated to coupling 12; coupling 14 discharges the second foamable chemical so that it may return to its source to be pressurized and returned to coupling 15; coupling 15 receives the pressurized second foamable chemical; coupling 16 receives air under pressure; coupling 17 receives solvent under pressure. The source of the pressurized air, solvent, and three chemicals is not shown, because it is conventional.

In traveling along internal passage way 18, the third chemical from coupling 11 is controlled by a solenoid operated valve 19, which is electrically actuated between a first position closing passage way 18 and a second position opening passage way. A conventional needle valve 20 may be threaded into and out of the passage way 18 to correspondingly calibrate the flow of the third chemical through the passage way 18 when the valve 19 is opened. Cross passage way 21 is in fluid communication with passage way 18. Needle valve 22 may be closed when it is desired to calibrate the flow of the third chemical by opening plug 23 so that passage way 21 may be connected to a suitable meter, while needle valve 20 is adjusted. After adjustment, plug 23 is replaced after disconnecting the meter and valve 22 is either fully opened if the third chemical is desired or fully closed if the third chemical is not desired. Since the third chemical is usually an additive or a catalyst, such calibration is important due to its critical nature. Passage way 21 is further fluid connected to passage way 23, which terminates at the coupling line 10.

The main body is provided with a large vertically extending bore 24 having at its opposite ends counter bores of larger diameter 25, which bore 24 at its center forms a valve chamber into which passage way 26 discharges the first foamable chemical received from coupling 12. Passage way 27 returns the first foamable chemical from the valve chamber to fluid coupling 13 so that the first chemical may travel in a closed recirculation path between the valve chamber and supply when the apparatus is not in active use. Plugs 28 and 29 have first cylindrical portions substantially the same diameter as and telescopically received within the bore 24, and second cylindrical flange portions received within the counter bores 25. O-rings are provided to seal the plugs, as shown, in the bore 24 to correspondingly seal the valve chamber; two tension bolts 30 tightly hold the plugs in place as shown. A single shaft 31 extends completely through the top plug 29, with an O-ring seal as shown, and into a blind bearing bore in the plug 28. Within the valve chamber, the shaft 31 has rigidly attached, parallel and horizontally extending arms mounting with universal lost motion at their outer ends a ball movable valve member 32. Preferably, the ball member is made from a resilient, synthetic resin that is highly resistant to the chemical action and other environmental conditions associated with the foamable chemicals. A passage way 33 extends from within the valve chamber to the coupling line 10. The passage ways 27 and 33 respectively form opposed annular valve seats within the valve chamber closely adjacent to the ball 32, so that with a 10° to 15° total pivotal movement of the shaft 31, the ball 32 may be pivoted between a position sealing passage way 27, its illustrated neutral position, and a position sealing passage way 33. In either of its sealed positions, the valve chamber will be pressurized by the first chemical from passage way 26 freely entering the valve chamber, so that the ball 32 will be tightly pressed by such pressure into further contact with the stationary annular valve seat formed by the respective passage way 27 or 33, which movement is accommodated by the universal lost motion connection between the ball 32 and parallel arms rigidly connected to shaft 31. When the valve is in position sealing the return passage way 27, the first chemical enters coupling 12, passes through passage way 26, the valve chamber, and passage way 33 to the coupling line 10.

Figure 6:
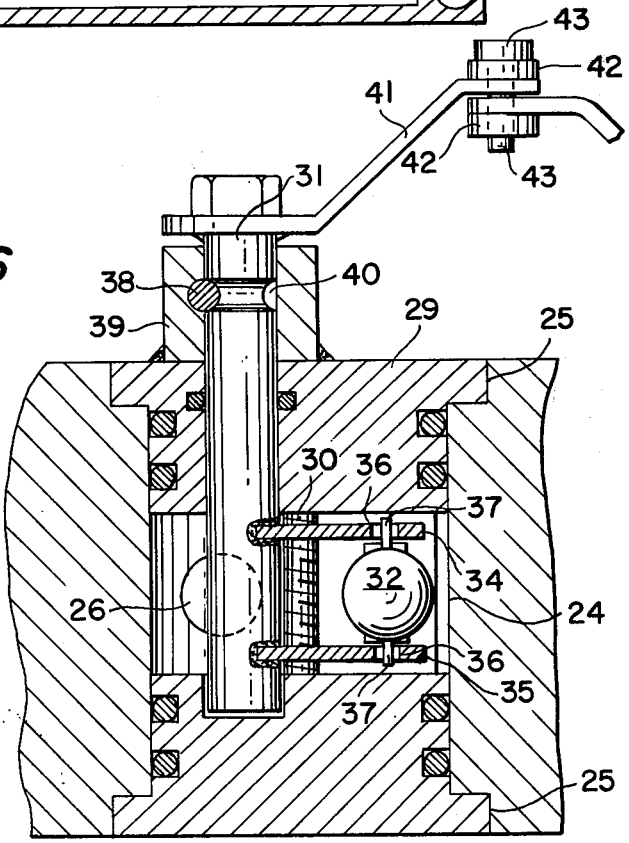
FIG. 6 is a cross-sectional view taken along line VI—VI of FIG. 1.

A detailed view of the above-described valve is shown in FIG. 6, with the previously mentioned parallel arms being shown at 34 and 35, wherein at one end they are rigidly secured, for example by welding, to the shaft 31, and where at their outer free ends, they have aligned oversized apertures 36 respectively receiving therein pins of considerably smaller diameter 37, which pins 37 are rigidly secured to and support ball 32. After the shaft and plugs are assembled, a cross pin 38 is threadably secured in a block 39 that is fixed to the upper plug 29, which pin 38 is received within an annular groove 40 on the shaft 31, to prevent axial movement of the shaft 31 and at the same time allow the pivotal valving movement of the shaft 31. A control arm 41 has one end fixedly secured to the upper end of the shaft 31, and its opposite end secured with lost motion to a reciprocating actuator fork 42 by means of a vertically extending pin 43 and aligned oversized apertures in the fork members 42 in the adjacent portion of arm 41.

The internal passage ways and valve for the second chemical with supply and return couplings 15, 14 respectively, is a mirror image of that already described with respect to the first chemical, so that further description of control of the second chemical is unnecessary. Reciprocation of actuator member 42 will thus simultaneously operate the valve for the first chemical and the valve for the second chemical in an identical manner.

Actuator member 42 is reciprocated by piston rod 44, which is threaded into the actuator member 42 and locked in adjusted position by lock nut 45. A conventional type of fluid cylinder, single acting with spring return, 46 is provided to reciprocate piston rod 44 as controlled by solenoid actuated valve 47 that controls the supply and exhaust of fluid to the cylinder 46 from control fluid coupling 48 that would lead to a conventional source of control fluid (not shown).

Pressurized air supplied to coupling 16 moves through passage way 49 under the control of selectively opened or closed solenoid actuator valve 50 through calibrating needle valve 51, cross passage 52 to both branch passages 53, 54 terminating at the coupling line 10. In a similar manner, pressurized solvent supplied to coupling 17 passes through passage way 54, selectively opened or closed solenoid actuator valve 55, calibrating needle valve 56, common cross passage way 52, and both branch passage ways 53, 54 to the couplling line 10.

For driving the mixer, the later be described, the motor and shaft arrangement are provided on the main body. Preferably, the motor 57 is hydraulically driven by motive fluid supply and exhaust ports 58, 59 under suitable valving control (not shown). Drive shaft 60 is rotatably mounted by bearings (not shown) in the main body, to be drivingly connected at one end to the rotary output of the motor 57 and have its opposite end terminate in a suitable coupling to be later desribed with respect to FIG. 4 at the coupling line 10.

The MIXING HEAD will now be described as illustrated in FIGS. 1, 2, 3 and 5. The mixing head is shown in FIGS. 1 and 2 to the right of coupling line 10 and includes the following separable items: check valves and gear block 60, automatic pressure responsive valve block 61, common conduit and mixing chamber block 62, bearing block 63, and fan spray nozzle 64. Suitable threaded fasteners are provided to releasably secure these basic elements together to form a rigid head structure, which elements are separated for periodic repair and cleaning.

Unit 60 has parallel and substantially identical straight through passage ways 65 aligned with and in fluid communicating with branch passage ways 53, 54 respectively; spring biased check valves 66 respectively for the first and second chemical passage ways 33; a counter rotating gear pair 67 having one of the counter rotating intermeshed spur gears of pair 67 being mounted on a shaft coupled to drive shaft 60. Only one each of the common elements are shown.

Figure 5:
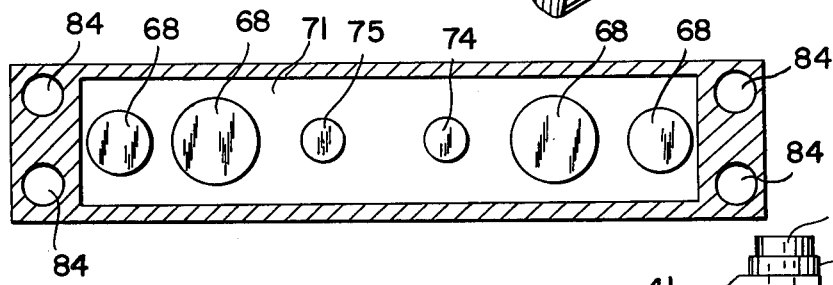
FIG. 5 is a cross-sectional view taken along line V—V of FIG. 1.

Block 61 is provided with through passage ways respectively fluid communicating with and aligned with passage ways 65 and check valves 66, and each containing within block 61 pressure responsive poppet valves. Each pressure responsive poppet valve includes a valve head 68, spring 69 that determines the pressure at which the poppet valve will open, and spring plate 70 threadably secured for axial adjustment on the valve stem connected to the valve head 68, to determine the spring pressure and thus the pressure at which the valve will open. Since all of these poppet valves are substantially identical, they will not be separately shown or separately described. These poppet valves may be of conventional construction per se, as may the check valves. As is seen in FIGS. 5 and 1, each of the poppet valve heads 68 extend into a common conduit 71. In FIG. 5, the outermost right and left hand valve heads 68 control the flow of mixed pressurized air and solvent into the common conduit 71 from the branch passage ways 53, 54. The left hand inner head 68 controls the flow of the second chemical into the common conduit, while the right hand inner head 68 controls the flow of the first chemical into the inner conduit. Preferably, the third chemical provided in lines 21, 23 will be mixed with the first chemical in the passage way 33 so that it will also be controlled by the right hand innermost poppet valve head 68. It is noted that the poppet valves for the first and second chemicals are substantially larger than the poppet valves for the air and solvent. The common conduit 71 is primarily formed by a recess in the left hand face of the unit 62.

The unit 62 is generally hollow to provide a mixing chamber opening in fluid communication into the common conduit 71 at one end and in fluid communication with the dipensing nozzle 64 at its opposite end. The dispensing nozzle 64 may be of conventional construction to provide a fan-shaped discharge of the chemicals; alternatively, the nozzle 64 may be plugged and a rectangular opening may be provided in the bottom of the unit 63 to provide a downward discharge 72 of the mixed chemicals, with it being understood that the rectangular passage way at the bottom of 63 would be plugged when the nozzle 64 would be in operation. Thus, the chemicals may be dispensed in any desired patterns, including the plugging of the rectangular opening and the removal of the nozzle 64 so that the chemicals would merely discharge from the right hand most end of the unit 63.

Figure 3:
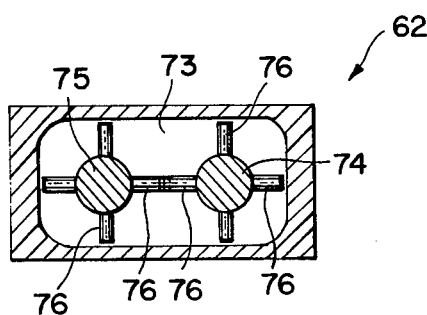
FIG. 3 is a cross-sectional view taken along line III—III of FIG. 2.

Within the mixing chamber 73, as shown in FIGS. 1 and 3, there are rotatably mounted parallel shafts 74, 75. Axially along each of the shafts 74, 75, there are through diametric bores at even spacing, which bores are formed at right angles with respect to their adjacent bores. Roll pins are inserted through each of the bores, respectively, with such roll pins being formed of sheet metal bent into a tube with a longitudinal gap and of a greater relaxed diameter than the bores, so that they may be compressed and inserted into the bores and held in place by friction. The shafts 74, 75 with their cross bores and roll pins 76 are constructed in an identical manner. The opposite ends of the shaft 74 are rotatably mounted in suitable bearings, with seals protecting the bearings, in the walls of the unit 62. Short drive shafts respectively couple the shafts 74, 75 with respective ones of the gears of gear pair 67, so that the shafts 74, 75 are counter rotated in unison. Although the shafts 74, 75 are identical in construction, they are rotated 90° with respect to each other so that adjacent roll pins 76 of the two shafts will be offset to avoid interference and to facilitate mixing of the chemicals when the shafts rotate. Pins 76 extend from the shaft a distance greater than one-half the distance between shafts to provide shear mixing as distinguished from impingement mixing.

Figure 4:
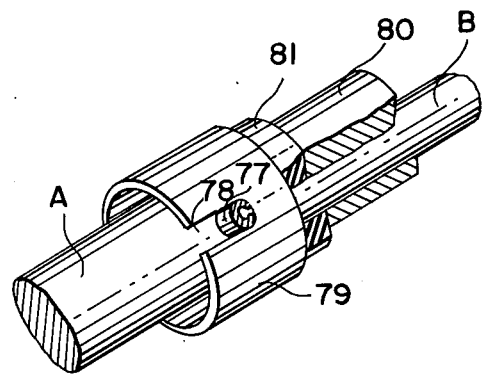
FIG. 4 is a perspective view of the coupling provided between the mixer shafts, and the head driving shafts, and further for the same coupling provided between the main head drive shaft and body drive shaft.

Since all of the above mentioned shafts are drivingly interconnected and since the main body is separable from the units 60, 61, 62, which units are in turn separable from each other, drive shaft couplings are provided at each separation as shown in FIG. 4. Since each of these drive shaft couplings is identical, only one will be described in detail. Shaft "A" is provided with a cross bore and roll pin 77 that is rotationally drivingly received within opposite slots (only one being shown) 78 in a cup-shaped member 79, which cup-shaped member is drivingly and fixedly secured to shaft "B." Due to the pin and slot connection, the cup-shaped member 79 and pin 77 may be axially separated, to correspondingly axially separate the shafts "A" and "B." One member to be separated would carry shaft "B" and rotationally supported with sleeve bearing 80 and fluid seal 81; the other shaft "A" would be within the other member to be separated, but would not need a bearing since its outer diameter is substantially the same as the inner diameter of the cup-shaped member 79(clearance exagerated).

In assembling or disassembling for repair or cleaning purposes, the units 60, 61 are fixedly secured to the main body by means of a plurality of bolts 82 extending through units 60, 61 and threadably secured to the main body. The unit 62 is in turn secured to the unit 61 by means of bolts 83 extending through bores 84 in unit 62 and threadably into unit 61.

OPERATION OF THE APPARATUS OF FIGS. 1–6

When foamable chemicals are not being mixed and dispensed, solenoid actuator valves 19, 50 and 55 are closed to prevent passage of the third chemical, compressed air and pressurized solvent to the mixing chamber. Further, solenoid actuator valve 47 is in a position such that the piston rod 44 will be moved to the right as shown in FIG. 1 and FIG. 2 to engage the balls 32 in the annular valve seats of passages 33 so that the first and second chemicals will enter port 12, circulate through the valve chamber and press the balls 32 tightly into sealing engagement with passage ways 33, and the exit through port 13 (respectively ports 15 and 14 for the second chemical), so that the first and second chemicals will travel in a closed recirculation loop between the valve chamber and the source without passing to the mixing chamber. This recirculation is very important in providing the proper flow of chemical under controlled pressure as closely as possible to the mixing chamber before dispensing so that the temperatures of the chemicals may be accurately controlled, so that the pressure may be accurately controlled, and so that when the chemical valves are opened, the right proportion of the two chemicals may be mixed. The proportion of the mixture, the temperature and the like is critical in determining the foam reaction time, which in turn is critical in accurately constructing the length of the conveyor run prior to reaching the pressurized tunnel and the length of the pressurized tunnel wherein the foamed materials are cured.

When it is desired to mix and dispense the chemicals, solenoid operated valve 47 is changed so as to move the piston rod 44 and actuator member 42 to their extreme left hand position, as shown in FIGS. 1 and 2, so that valve ball 32 will be moved to the position to close return conduits 27, so that the first chemical supplied to coupling port 12 and the second chemical supplied to coupling port 15 and circulating within the valve chamber will immediately pass through respective passage ways 33 to the mixing chamber 73. Since the valve ball 32 moves from one closed position through its neutral illustrated position to its opposite closed position, the flow of chemicals within passage ways 26 will be substantially uneffected to provide for a smooth transition from return passage way 27 to supply passage ways 33. Also, the motive fluid will be supplied to the motor 57 to rotate the counter rotating mixer shafts 74, 75. When pressurized first and second chemicals are provided in passage ways 33, they automatically open up check valves 66 and poppet valves 68, so that the first and second chemicals are separately delivered to common conduit 71 through poppet valve head 68, from where they travel to mixing chamber 73 where they are mixed by the rotating pins 76 prior to being dispensed through nozzle 64 or being dispensed downwardly in flow 72.

When dispensing is terminated, suitable controls (not shown) will automatically actuate solenoid operator valve 47 to move valve balls 32 from their far left hand position, as viewed in FIGS. 1 and 2, to their far right hand position to prevent further flow of chemicals 1 and 2 to the mixing chamber, and substantially simultaneously solenoid operated valves 50, 55 will be opened to permit flow of mixed compressed air and solvent through branch passage ways 53, 54 and their respective pressure operated poppet valves into common conduit 71. Of course, when the poppet valves for the solvent and air are opened, the poppet valves for the first and second chemicals will be closed due to the lack of chemical pressure in passage ways 33 when ball valves 32 are shifted to their right hand position closing off passage ways 33. As shown in FIG. 5, the mixture of solvent and air will be supplied into common conduit 71 from the outermost poppet valve heads 68 to sweep across the now closed innermost poppet valve heads 68 control the two chemicals), around shafts 74, 75 and into the mixing chamber 73. During the supply of solvent and air, rotation of the shafts 74, 75 is continued so that they will be thoroughly cleaned.

Thereafter, the solenoid operated valves 50, 55 are closed and rotation of the shafts 74, 75 may or may no be discontinued. When it is desired to dispense more foam, the above process is repeated.

If it is desired to provide a catalyst or other third chemical from coupling port 11, the solenoid operated valve 19, is opened at the same time that passage ways 33 are opened by shifting of the ball valve 32 towards the left in FIGS. 1 and 2, and the third chemical is then moved into first chemical passage way 33.

THE EXTENSION OF FIGS. 7 AND 8

When it is desired to dispense foam across a considerable width within a molding chamber, the unit 60 is separated from the main body along coupling line 10 and the extension of FIGS. 7 and 8 is inserted between unit 60 and the main body. Accordingly, the extension of FIGS. 7 and 8 may be of any desired length. For example, the extension of FIGS. 7 and 8 may be 3 feet long so that with the mixing head to the right of coupling 10 in FIGS. 1 and 2, the entire extension and mixing head unit would be 4 feet long so that the mixing head could be inserted into a 4 foot wide panel molding cavity and reciprocated generally with a 4 foot amplitude to lay down a zigzag pattern of foam within the molding cavity that would be moving continuously at right angles to the reciprocation of the mixing head.

It is noted from FIGS. 1, 2, 3 and 5 that the mixing head has a very small height, which is its critical dimension with respect to entering the molding cavity. This small height is possible because the controllable valves and drive motors are all connected to the main body and do not enter into the mold cavity, and further because the drive shafts 74, 75, the four pressure responsive poppet valves 68–70, the two check valves 66, the gear pair 67, and passages 65 all lie generally within a common horizontal plane. Due to this small height, the entire mixing head may be inserted into the mold cavity so that the two chemicals will not contact each other until the last minute and thereafter be immediately mixed and discharged with a minimum of time within the mixing head after being combined. This minimum time within the mixing head is accomplished by the pressure responsive valves being located as closely as possible to the mixing chamber, which pressure responsive poppet valves will prevent mixing of the chemicals prior to their entering the common conduit 71. Further, this provides for a minimum surface area to be cleaned by the solvent and air.

The extension shown in FIGS. 7 and 8 includes a plate 100 having a plurality of bolt holes 101, through which bolts (not shown) may pass and be threaded into the main body. Further, the extension includes a generally rectangular cross section block 102, of any desired length, having its left hand end, as viewed in FIG. 7, sealingly and rigidly secured, for example welding, to the plate 100, and interbraced with respect to the plate 100 by buttresses 103. Four longitudinally extending bores 104 extend for the entire length of the extension and parallel to each other in alignment with and in the same pattern as the bores 84 shown for the mixing head in FIG. 5, so that tension bolts similar to, but considerably longer than bolts 82 may be passed through units 62, 61, 60, block 102 and plate 101, in order and screwed into the threaded blind passage ways in the main body to secure the mixing head on the right hand end of the extension and to further brace the extension with respect to the main body.

The extension further carries a single drive shaft 105 rotatably supported in sleeve bearings 106, 107 and having a coupling at one end similar to coupling 77 and a coupling at its opposite end similar to coupling 78, 79. This drive shaft would be used to transmit the mixer driving power from the main body to the mixing head.

Further, the extension is provided with drilled passage ways 108, 109, 110 and 111 that when assembled would be in communication at their left hand end with respectively passage ways 53, 33, 33 and 54 for respectively passing air-solvent mixture, the first chemical, the second chemical, and air-solvent mixture. The right hand end of bores 108, 109, 110, 111, when assembled, would be respectively fluid connected to air-solvent passage way 65, first chemical check valve 66, second chemical check valve 66, and air solvent passage way 65 in the mixing head.

Any type of releasable fluid couplings may be provided between the mixing head and main body along coupling line 10, for example abutting passage ways with an O-ring between, but the fluid passage way coupling means for the main body would be substantially identical to those for the right hand portion of the extension shown in FIG. 7 and the coupling means for the mixing head would be substantially identical to the coupling means for the left hand portion of the extension as shown in FIG. 7, so that the mixing head may be either directly coupled to the main body or coupled to the main body with the interposition of the extension of FIG. 7, without any modification except for the provision of longer bolts 82. Further, that portion of the drive coupling in FIG. 4 that would be provided for the mixing head would be substantially identical to that provided for the left hand end of the drive shaft 105, and the other portion of the coupling of FIG. 4 for the main body would be substantially identical to that provided for the right hand end of shaft 105. Where the shafts 74, 75 enter from the mixing chamber into the unit 61, suitable rotational seals are provided so that chemicals may not be in contact with the gear pair 67, the shaft 105, or various bearings.

It is thus seen that the apparatus of the present invention provides for a universally adapted foam mixing unit that may dispense foam in a fan shape, downwardly or outwardly, inmost any type of mold, including an open top mold and a mold having a very narrow elongated opening, for example of only 1 inch height between opposed rigid panels partially shown in FIG. 2. As one specific example of use, the apparatus shown in the drawing may be used as the mixing and dispensing apparatus of copending application Ser. No. 570,451, now Pat. No. 4,051,209, filled on the same date with the present application, and commonly assigned. The opposed rigid panels or sheets would define therebetween a mold cavity into which the head and extension are fully insertable due to their small height with the main body always remaining outside of the mold cavity.

While a specific preferred embodiment of the present invention has been shown and described in detail, with particular and specific advantages being attributable to such details, variations, modifications and further embodiments are contemplated according to the broader aspects of the present invention, all as defined by the spirit and scope of the following claims.

I claim:

1. An apparatus for mixing at least two foamable fluent chemicals and depositing the chemicals in a mold cavity, the improvement comprising: controllable valve means for selectively supplying and not supplying separately the two chemicals; two automatic valve means normally biased closed and opened at a predetermined fluid pressure on their inlet side for passing fluids to their outlet side; conduit means fluid connected between each of said controllable valve means and a separate one of said automatic valve means for separately conducting the two chemicals supplied by said controllable valve means to the inlet sides respectively of said automatic valve means; a mixing chamber in direct fluid communication with the outlet sides of said automatic valve means for commonly receiving both of said chemicals passing respectively through said automatic valve means; mechanically driven means operatively mounted within said mixing chamber for mixing said two chemicals in said mixing chamber; means operatively associated with said mixing chamber for discharging the thus mixed chemicals from said mixing chamber to the mold cavity; motor means operatively associated with said mechanically driven mixing means for driving said mechanically driven mixing means; a main body carrying said motor means and said controllable valve means; drive means mechanically connected to said main body for moving said main body toward and away from a mold cavity; a mixing head being supportively connected at one end to said main body and extending as a cantilevered beam freely from said main body at its one end toward its opposite end, said mixing head carrying said discharge means adjacent its opposite end, and further carrying said mixing chamber, said mechanically driven means and said automatic valve means.

2. The apparatus of claim 1, wherein said mechanically driven mixing means includes two parallel shafts respectively rotatably mounted in said mixing chamber and extending generally in a common plane with said automatic valve means, and further having a plurality of radially extending fluid beaters drivingly connected to said shafts; each of said shafts having a beater end in said mixing chamber, and a drive end outside of said mixing chamber and sealed with respect to said mixing chamber; gear means drivingly interengaged and respectively drivingly connected to said shafts for synchronously counter rotating said shafts outside of said mixing chamber.

3. The apparatus of claim 1, further imcluding: a separate extension member being releasably and selectively secured to said apparatus and having therein a rotatably mounted drive shaft with releasable coupling means at its opposite ends for being releasably connected to said mechanically driven mixing means at one end and to said motor means at its opposite end; a plurality of conduits within said extension member for respectively carrying the two chemicals, with each having releasable coupling means at opposite ends for respectively connecting to said controllable valve means and said automatic valves; coupling means operatively associated with said controllable valve means for directly connecting said controllable valve means with their respective automatic valve means independently of said extension member; and said extension having a length that is a multiple of the length of said mixing chamber.

4. The apparatus of claim 3, wherein said main body has an outer coupling portion with exposed ports respectively fluid connected to the outlet side of said controllable valve means and a releasable mechanical coupling for said drive motor means in a fixed predetermined pattern; said mixing head having an exposed portion remote from said discharge means having exposed ports respectively fluid connected to said automatic valve means and releasable mechanical coupling means for said mechanically driven mixing means in a fixed pattern complimentary to the pattern of said main body so as to be respectively sealingly and drivingly interengaged; and releasable means operatively associated with said main body for rigidly holding said head and main body in said interengaged position.

5. The apparatus of claim 4, wherein said mixing head and extension member each have a width several times their height, and a length several times their width, respectively.

6. The apparatus of claim 4, further including check valve means in said mixing head fluid connected between each of said chemical automatic valve means and said chemical controllable valve means.

7. The apparatus of claim 1, including automatic valve means immediately adjacent at least one of said first mentioned two chemical automatic valve means and having a solvent inlet and a solvent outlet for passing solvent from its inlet to its outlet only at a pressure above a predetermined pressure; controllable valve means for selectively supplying solvent under pressure to the inlet of said solvent automatic valve means; conduit means serially fluid connecting the outlet of said solvent automatic valve means, the outlet of said at least one chemical automatic valve means and said mixing chamber, in order, so that solvent passing through the outlet of said solvent automatic valve means will flow past and wash the outlet side valve face of said at least one chemical automatic valve means before passing into said mixing chamber.

8. The apparatus of claim 7, wherein said mechanically driven mixing means includes two parallel shafts extending generally in a common plane with said automatic valve means, and further having a plurality of radially extending fluid beaters drivingly connected to said shafts; each of said shafts having a beater end in said mixing chamber; gear means drivingly interengaged and respectively drivingly connected to said shafts for synchronously counter rotating said shafts outside of said mixing chamber.

9. The apparatus of claim 7, further including: a separate extension member being releasable and selectively secured to said apparatus and having therein a rotatable mounted drive shaft with releasable coupling means at its opposite ends for being releasable connected to said mechanically driven mixing means at one end and to said motor means at its opposite end; a plurality of conduits within said extension member for respectively carrying the two chemicals and solvent, with each having releasable coupling means at opposite ends for respectively connecting to said controllable valve means and said automatic valves; coupling means operatively associated with said controllable valve means for directly connecting said controllable valve means with their respective automatic valve means independently of said extension member; and said extension having a length that is a multiple of the length of said mixing chamber.

10. The apparatus of claim 9, wherein said main body has an outer coupling portion with exposed ports respectively fluid connected to the outlet side of said controllable valve means and a releasable mechanical coupling for said drive motor means in a fixed predetermined pattern; said mixing head having an exposed portion remote from said discharge means having exposed ports respectively fluid connected to said automatic valve means and releasable mechanical coupling means for said mechanically driven mixing means in a fixed pattern complimentary to the pattern of said main body so as to be respectively sealingly and drivingly interengaged; and releasable means operatively associated with said main body for rigidly holding said head and main body in said interengaged position.

11. The apparatus of claim 7, including a second solvent automatic valve means substantially identical to said first mentioned solvent automatic valve means and having its inlet side commonly fluid connected with the inlet of said first mentioned solvent automatic valve means and its outlet side immediately adjacent the other of said chemical automatic valve means; said four automatic valve means being arranged substantially in a common plane with said chemical automatic valve means to the interior and said solvent automatic valve means to the exterior; said conduit means further conducting the solvent for the outlet side of said second solvent automatic valve means across the outlet side face of said second chemical automatic valve means and then to said mixing chamber for washing said second chemical automatic valve means; said conduit means opening into one end of said mixing chamber and said discharge means opening into the opposite end of said mixing chamber so that the solvent after washing said chemical automatic valve means will pass through the entire interior of said mixing chamber before being discharged through said discharge means.

12. The apparatus of claim 11, including at least one drive shaft generally lying in said common plane and being drivingly connected to said mechanically driven mixing means, said shaft extending through said conduit means between said chemical automatic valve means, and having rotational seal means in the wall of said conduit means so that the portion of said shaft exposed to the chemicals will be washed by the solvent passing through said conduit means into said mixing chamber.

13. The apparatus of claim 12, wherein said mechanically driven mixing means includes two parallel shafts respectively rotatably mounted in said mixing chamber and extending generally in a common plane with said automatic valve means, and further having a plurality of radially extending fluid beaters drivingly connected to said shafts; each of said shafts having a beater end in said mixing chamber, and a drive end outside of said mixing chamber and sealed with respect to said mixing chamber; gear means drivingly interengaged and respectively drivingly connected to said shafts for synchronously counter rotating said shafts outside of said mixing chamber.

14. The apparatus of claim 12, further including: a separate extension member being releasably and selectively secured to said apparatus and having therein a rotatably mounted drive shaft with releasable coupling means at its opposite ends for being releasably connected to said mechanically driven mixing means at one end and to said motor means at its opposite end; a plurality of conduits within said extension member for respectively carrying the two chemicals and solvent, with each having releasable coupling means at opposite ends for respectively connecting to said controllable valve means operatively associated with said controllable valve means and said automatic valves; coupling means for directly connecting said controllable valve means with their respective automatic valve means independently of said extension member; and said extension having a length that is a multiple of the length of said mixing chamber.

15. The apparatus of claim 14, wherein said main body has an outer coupling portion with exposed ports respectively fluid connected to the outlet side of said controllable valve means and a releasable mechanical coupling for said drive motor means in a fixed predetermined pattern; said mixing head having an exposed portion remote from said discharge means having exposed ports respectively fluid connected to said automatic valve means and releasable mechanical coupling means for said mechanically driven mixing means in a fixed pattern complimentary to the pattern of said main body so as to be respectively sealingly and drivingly interengaged; and releasable means operatively associated with said main body for rigidly holding said head and main body in said interengaged position.

16. The apparatus of claim 15, wherein said patterns have said ports and releasable couplings in a common plane.

17. The apparatus of claim 15, wherein said extension member coupling means at one end are substantially identical to and in the same pattern as said main body ports and coupling, and at its opposite end in substantially the same pattern and substantially identical to said mixing head ports and coupling so as to be sealingly and drivingly connected between said mixing head and main body for conducting fluid and mechanical driving power from said main body to said mixing head over a desired extended length; and releasable fastening means operatively associated with said main body for rigidly and sealingly clamping said head, extension member and main body serially together.

18. The apparatus of claim 2, further including: a separate extension member being releasably and selectively secured to said apparatus and having therein a rotatably mounted drive shaft with releasable coupling means at its opposite ends for being releasably connected to said mechanically driven mixing means at one end and to said motor means at its opposite end; a plurality of conduits within said extension member for respectively carrying the two chemicals and solvent, with each having releasable coupling means at opposite ends for respectively connecting to said controllable valve means and said automatic valves; coupling means operatively associated with said controllable valve means for directly connecting said controllable valve means with their respective automatic valve means independently of said extension member; said extension having a length that is a multiple of the length of said mixing chamber; said main body having an outer coupling portion with exposed ports respectively fluid connected to the outlet side of said controllable valve means and a releasable mechanical coupling for said drive motor means in a fixed predetermined pattern; said mixing head having an exposed portion remote from said discharge means having exposed ports respectively fluid connected to said automatic valve means and releasable mechanical coupling means for said mechanically driven mixing means in a fixed pattern complimentary to the pattern of said main body so as to be respectively sealingly and drivingly interengaged; and releasable means operatively associated with said main body for rigidly holding said head and main body in said interengaged position.

19. The apparatus of claim 18, wherein said extension member coupling means at one end are substantially identical to and in the same pattern as said main body ports and coupling, and at its opposite end in substantially the same pattern and substantially identical to said mixing head ports and coupling so as to be sealingly and drivingly connected between said mixing head and main body for conducting fluid and mechanical driving power from said main body to said mixing head over a desired extended length; and releasable fastening means operatively associated with said main body for rigidly and sealingly clamping said head, extension member and main body serially together.

20. The apparatus of claim 2, wherein each of said shafts has a serial array of through diametric bores along its length which bores are angularly oriented with respect to the adjacent bores, said beaters are pin means rigidly secured in each of said bores and having opposite ends extending radially from said shafts; said shafts are angularly displaced with respect to each other so that one pin of one shaft will have a center line passing through the rotational axis of the other shaft and intersecting a pin of the other shaft at a substantial angle in one position of said shafts.

21. The apparatus of claim 20, wherein each of said pins is a roll pin only frictionally connected with its respective shaft by virtue of having a free relaxed general outer diameter substantially larger than the inner diameter of its associated bore.

* * * * *